United States Patent [19]

Shiba et al.

[11] Patent Number: 5,550,996
[45] Date of Patent: Aug. 27, 1996

[54] ROM BURST TRANSFER CONTINUOUS READ-OUT EXTENSION METHOD AND A MICROCOMPUTER SYSTEM WITH A BUILT-IN ROM USING THIS METHOD

[75] Inventors: Masue Shiba, Ftyu; Shigeharu Nakata, Yokohama, both of Japan

[73] Assignee: Kabushiki Kaisha Toshiba, Kanagawa-ken, Japan

[21] Appl. No.: 143,779

[22] Filed: Nov. 1, 1993

[30] Foreign Application Priority Data

Nov. 2, 1992 [JP] Japan .................................. 4-294154

[51] Int. Cl.$^6$ .................. G11C 8/00; G06F 12/06
[52] U.S. Cl. ............... 395/421.03; 395/405; 365/230.03
[58] Field of Search ............... 365/230.03, 104, 365/230.04, 289.02, 189.07, 230.02, 239; 395/400, 425, 421.03, 421.08, 421.09, 421.1, 405

[56] References Cited

U.S. PATENT DOCUMENTS

| | | | |
|---|---|---|---|
| 4,583,162 | 4/1986 | Prill ..................................... | 395/421.03 |
| 5,007,011 | 4/1991 | Murayama ........................ | 395/421.03 |
| 5,247,644 | 9/1993 | Johnson et al. ..................... | 395/484 |
| 5,261,064 | 11/1993 | Wyland ............................. | 395/421.01 |
| 5,285,421 | 2/1994 | Young et al. ....................... | 365/230.04 |
| 5,345,573 | 9/1994 | Bowden, III et al. .............. | 395/421.07 |
| 5,384,745 | 1/1995 | Konishi et al. ..................... | 365/230.03 |
| 5,386,537 | 1/1995 | Asano ................................ | 395/484 |

FOREIGN PATENT DOCUMENTS

| | | |
|---|---|---|
| 0055579 | 7/1982 | European Pat. Off. . |
| 0174845 | 3/1986 | European Pat. Off. . |
| 0174845A2 | 3/1986 | European Pat. Off. . |
| 0570164A1 | 11/1993 | European Pat. Off. . |

*Primary Examiner*—Jack A. Lane
*Attorney, Agent, or Firm*—Finnegan, Henderson, Farabow, Garrett & Dunner, L.L.P.

[57] ABSTRACT

A microcomputer with a built-in ROM for a burst transfer method has a ROM divided into blocks, for reading data by being supplied with an address, a first control circuit for supplying the address to the ROM, an adder for adding a specific address value to the address and outputting an added address which is the result of the addition, a comparator for comparing the next supplied address and the added address and outputting the result of the comparison, a second control circuit for supplying a control signal indicating to the first control circuit that a burst transfer will or will not be executed, based on the result of the comparison output by the comparator, and a selector for selecting data output from each block and outputting the data to a bus. In the microcomputer, the address includes selection data for selecting any of the blocks, and the address and the added address are input to the blocks, so that data corresponding to the address or the added address is input in accordance with the selection data in the address. The selector selects and outputs the output data from the blocks in accordance with the selection data in the address. The first control circuit controls the timing of the supply of the address so that it is synchronized with the read-out timing of the ROM based on the control signal supplied from the second control circuit.

4 Claims, 6 Drawing Sheets

ROM BURST TRANSFER CONTINUOUS READ-OUT EXTENSION METHOD AND A MICROCOMPUTER SYSTEM WITH A BUILT-IN ROM USING THIS METHOD

FIELD OF THE INVENTION

The present invention relates to a microcomputer with a built-in program and a method for reading data (memory access method) in the microcomputer, and, in particular, to a microcomputer with a built-in program, including a means for increasing the number of continuous read-outs of data in a ROM with a built-in program provided in the microcomputer and for speeding up the time for the read-out (access time), and a read-out method.

DESCRIPTION OF THE PRIOR ART

A mask ROM used with a microcomputer which has a built-in program is normally formed in a NAND configuration from the aspect of high integration. However, a ROM with a NAND configuration normally has between four and ten NMOSFETs connected in series between the bit line and ground potential. For this reason the problem arises that the discharge time of the bit line is increased, and, as a result, the access time is also increased. Specifically, the greater the degree of integration of the microcomputer, the greater the increase in the read-out time required. In other words, there is the problem of a decrease in the read-out operation margin within a specified number of clock cycles. Conventionally, various measures have been implemented to solve this problem.

Included among these measures is burst transfer. Burst transfer is a transfer method by which, for example, as illustrated in FIG. 1, when a continuous address signal of 2i cycles (in FIG. 1, i=2; normally i=1, 2, . . . ) connected to a head address 4N set within the time for one clock cycle by a pair of system clocks 1 and 2 (a total of two system clocks) is fetched, and a lead signal ROMRD is output synchronized with a system clock 2, data in the ROM corresponding to this address signal is output on a bus BUS<>.

FIG. 2 is a general configuration drawing for hardware centered on a ROM for providing a memory access method as illustrated in the burst transfer timing chart illustrated in FIG. 1.

This ROM is divided into four blocks. Specifically, the case where i=2 is shown in the example in FIG. 2(i=2; $2^i=2^2=4$; banks 0, 1, 2, and 3). The memory cells in the blocks are selected from the higher order bits A <12, 3> except for the lower order i=2 bits of the address data as shown in a selector circuit 3. Each block, or, more specifically, each bank, is selected by the lower order i=2 bit A<2, 1> of the address data.

The symbol "⊚" indicates an NMOS transistor, and "A10.ROMOUT0" and "(A10)T.ROMOUT0" designate readout access timing signals. A pair of addresses A11 and A12 select a column in each bank which is designated by the addresses A1 and A2. The addresses A6 to A9 designate one group of NANDROMs in each bank. There are 16 groups of NANDROMS in each bank. The addresses A3 to A5 designate a row in each bank.

Accordingly, during memory access, the data in the memory cells in the banks 0 to 3 in sequence is output on a read-out address bus BUS <> according to the combination of the values of the address data A<12, 3> and the address data A<2, 1>.

During this burst transmission period, the data in $2^i$, specifically, 4, memory cells can be read out in one clock cycle (four system clocks). For example, as outlined above, as opposed to the read-out time required of a minimum of seven to nine clock cycles in the case where four continuous addresses (4N, 4N+1, 4N+2, 4N+3) are input to the ROM, from a normal memory address not using burst transfer (fetch operation), this read-out operation is completed in, at most, five clock cycles with memory access using burst transfer (burst fetch access). Therefore a high speed read-out operation can be executed.

As can be understood from the foregoing explanation, for a conventional microcomputer with a built-in program, it is possible to execute a continuous high speed read-out operation for data in a maximum of $2^i$ memory cells, in comparison with normal memory access, by the adoption of the burst transfer method.

However, for example, even when more than $2^i$ continuous addresses are specified, the number of memory cells which are the object of a continuous high speed read-out is $2^i$ at the maximum. This limitation becomes a problem for a continuous high speed read-out operation.

In other words, when all bits of a total of i lower order bits of address data are 0 . . . OH, two system clock cycles are required for the read-out operation.

Even when all bits of a total of i lower order bits of address data are 0 . . . OH, and the read-out operation can be completed in one clock cycle, regardless of the number of clock cycles, specifically, it is possible to execute a burst transfer read-out operation continuously only up to the number of items of address data provided continuously.

SUMMARY OF THE INVENTION

Accordingly, an object of the present invention is, with due consideration to the drawbacks of such conventional burst transfer methods and devices, to provide a ROM burst transfer continuous read-but extension method capable of continuous memory access, and a microcomputer using this method, regardless of the number of banks ($2^i$).

The present invention provides a memory device as a preferred embodiment, which comprises:

memory means comprising a plurality of blocks for data by being supplied with an address; and an adder for adding a specific address value to the address and outputting an added address, wherein:

each block includes a selection means for further inputting and selecting either the address or the added address;

the address includes selection data for selecting either the address or the added address; and said memory device outputs data corresponding to either the address or the added address, according to the selection data within the address.

The present invention further provides a microcomputer system with a built-in ROM for a burst transfer method as another preferred embodiment, which comprises:

memory means divided into a plurality of blocks, for reading data by being supplied with an address;

first control means for supplying the address to said memory means;

addition means for adding a specific address value to the address and outputting an added address which is the result of the addition;

comparison means for comparing the next supplied address and the added address and outputting the result of the comparison;

second control means for supplying a control signal indicating to said first control means that a burst transfer will or will not be executed, based on the result of the comparison output by said comparison means;

selection means for selecting data output from the blocks and outputting the data, wherein, the address includes selection data for selecting any of the blocks, and the address and the added address are input to the blocks, so that data corresponding to the address or the added address is input in accordance with the selection data in the address, said selection means selects and outputs the data from the blocks in accordance with the selection data in the address, said first control means controls so that the timing of the supply of the address is synchronized with the read-out timing of said memory means based on the control signal supplied from said second control means.

The present invention provides a microcomputer system as another preferred embodiment, in the microcomputer system as described above, the selection data is represented by the lower order i bits (where i is a positive integer) in the address. The selected data stored in said memory means is selected by bits other than the lower order i bits of the address. The memory means is divided into $2^i$ blocks.

The present invention provides a continuous read-out extension method for a burst transfer method as another preferred embodiment, which comprises:

a step of adding the address of a specified value to the address included in the selection data;

a step of supplying the address and the added address to the blocks for carrying out the data read operation;

a step of comparing the address next supplied to the address and the added address, and outputting the results of the comparison;

the step of instructing the ROM to execute a burst address transfer operation when the address and the added address are in agreement, based on the results of the comparison, and instructing the ROM to execute a normal transfer when the address and the added address are not in agreement; and a step of selecting data output from the blocks and outputting that data to an external destination, based on the selected data.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Other features of the invention will become apparent in the course of the following description of exemplary embodiments which are given for illustration of the invention and are not intended to be limiting thereof.

First, the basic concept of the ROM burst transfer continuous read-out extension method of the present invention and a microcomputer with a built-in program using the method will be outlined, followed by an explanation of the embodiments.

In the microcomputer with a built-in program of the present invention, when continuous address data is input to a memory such as a ROM or the like from a CPU, for example, the address data and an added address value obtained by adding "1" to the address data are input to the ROM.

The body of the ROM is divided into $2^i$ (i=1, 2, ... ) blocks. The input address value and the added address value which is the input address value incremented by +1 are input to the respective blocks. In addition, a selector is provided in each block, and this selector is operated in accordance with block selection data which is supplied using part of the address data, so that access to each block is selectively controlled.

As a result, it is possible to execute burst transfer for each block without interruption. In addition, a microcomputer is provided, comprising a ROM which can provide a high speed read-out whereby the timing of the data read-out of the CPU and the data transfer of the ROM is synchronized, by providing a logic circuit for long term maintenance of the added address value which compares the added address value with the input address data and transmits the result to the CPU.

Next, a first embodiment of the present invention will be explained with reference to the block diagram of FIG. 3, the timing chart of FIG. 4, and the flow chart of FIG. 6. This embodiment will be explained for the case where the body of the ROM is divided into two blocks (i=1), and the lower order bit of the address data is used as a selector signal.

Figure 1:
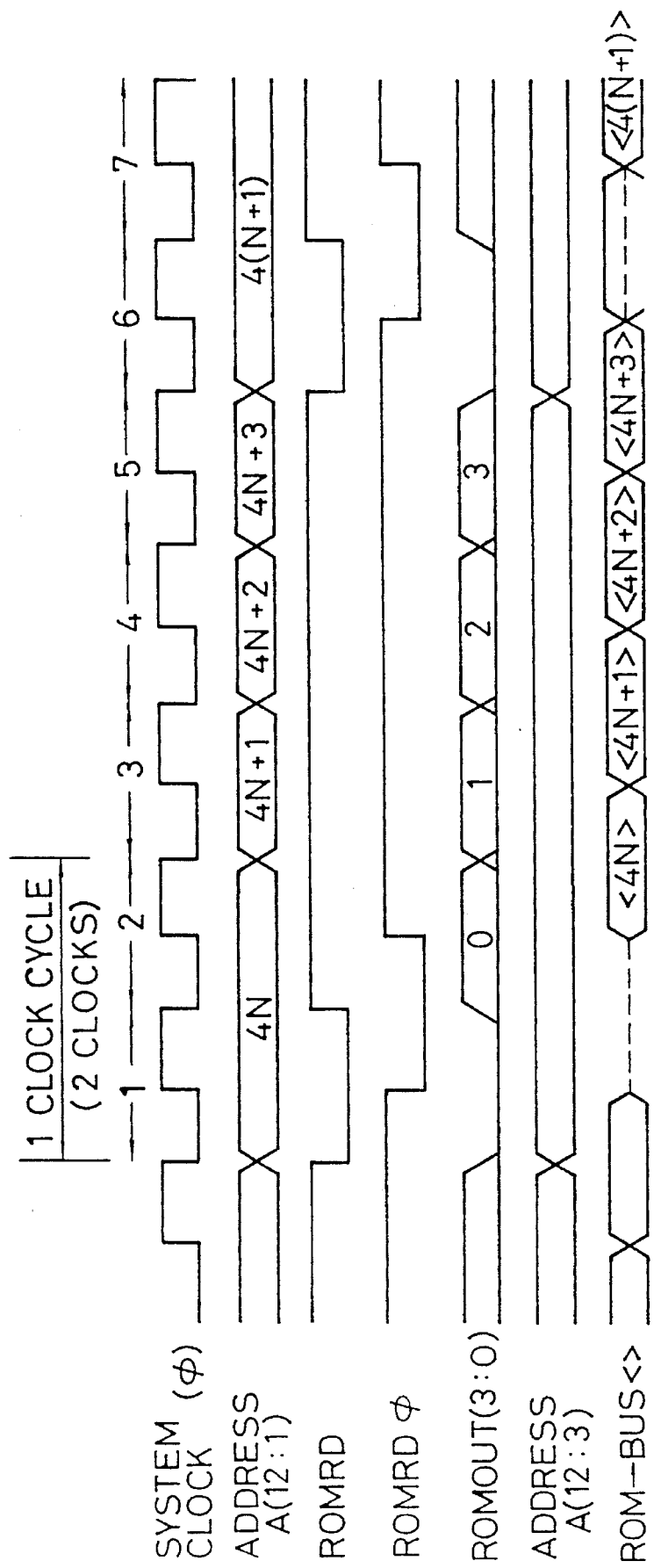
FIG. 1 is a timing chart for a conventional ROM burst transfer.
Figure 2:
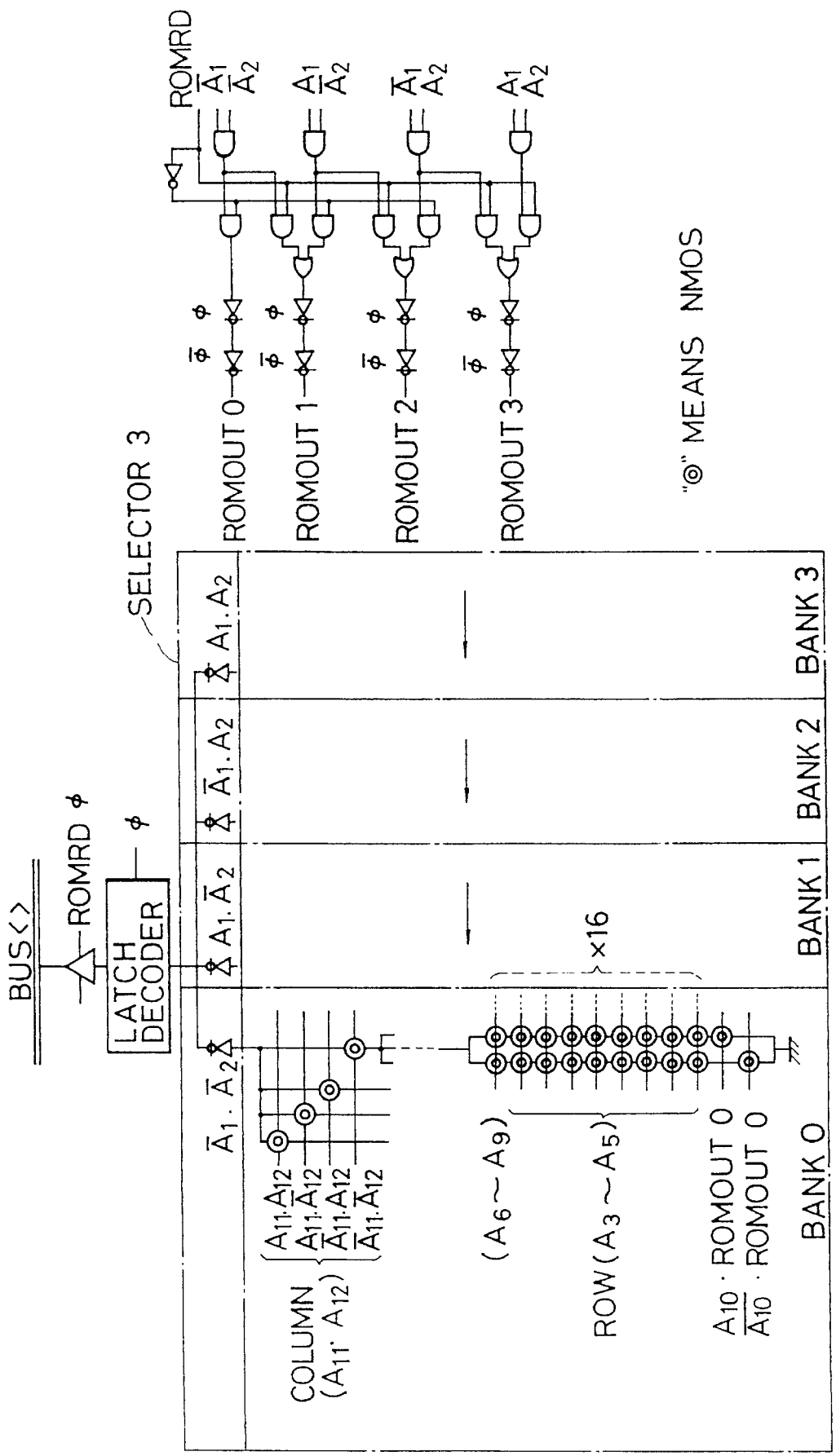
FIG. 2 is a configuration drawing showing the relationship between a bank within a ROM in a microcomputer for performing the burst transfer illustrated in FIG. 1 and an address bit line.
Figure 3:
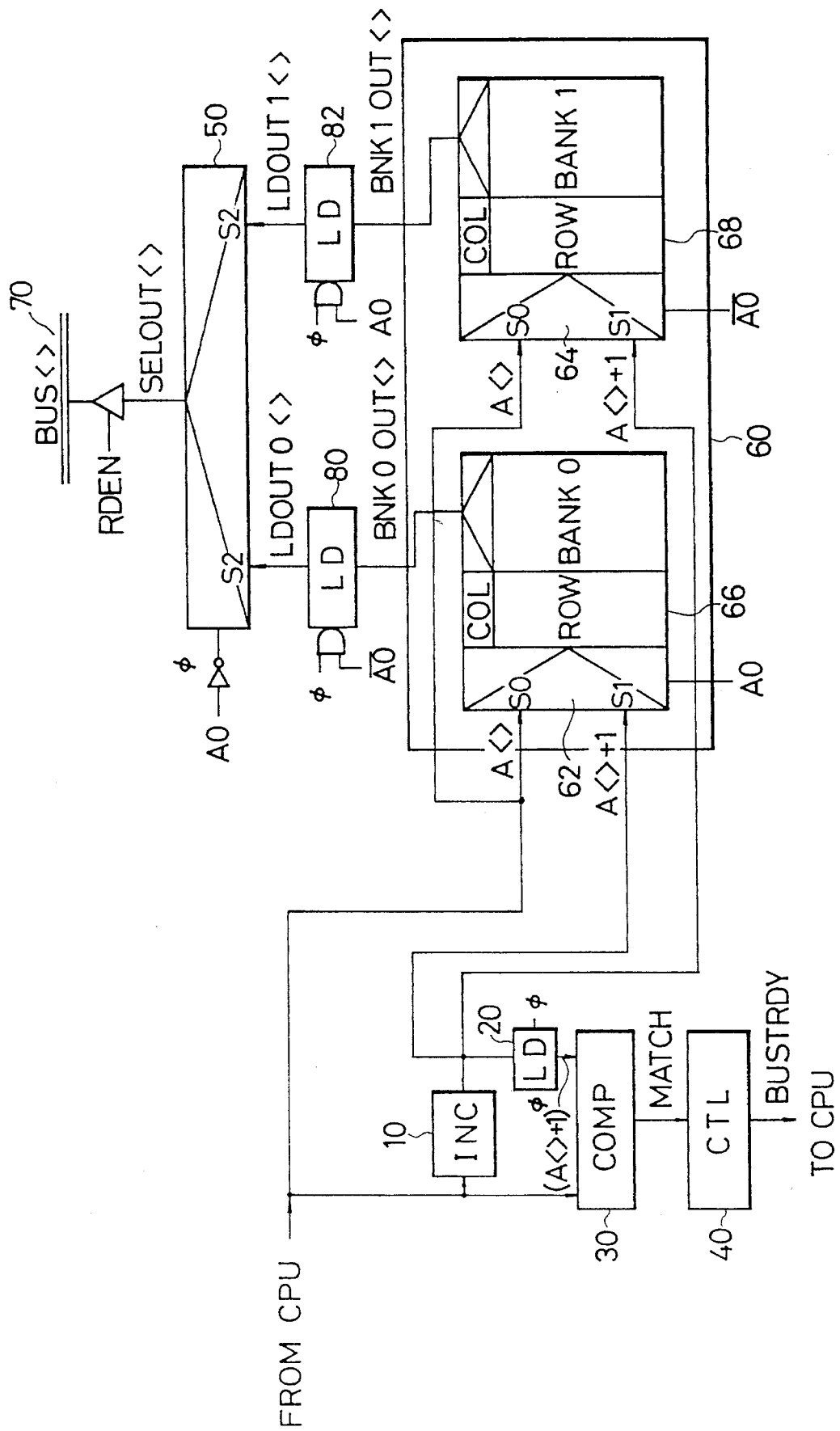
FIG. 3 is a configuration drawing of a first embodiment of a microcomputer with a built-in program using a continuous read-out method for ROM burst transfer of the present invention.
Figure 4:
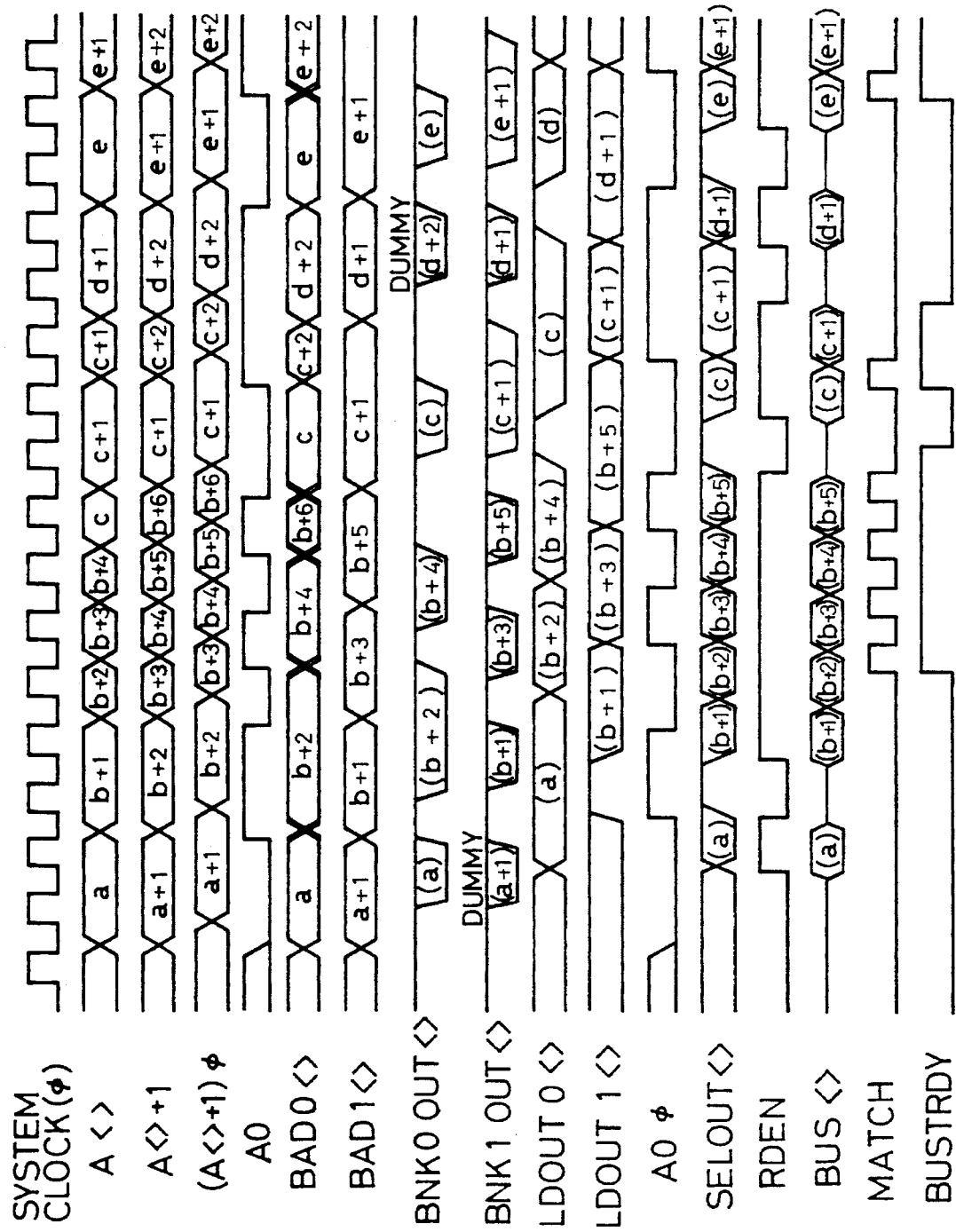
FIG. 4 is a timing chart showing a burst transfer operation in the microcomputer shown in FIG. 3.

The timing chart shown in FIG. 4 is a timing chart for comparing the system operation during normal address data transfer and burst transfer for a microcomputer with a built-in program of the first embodiment shown in FIG. 3.

Figure 6:
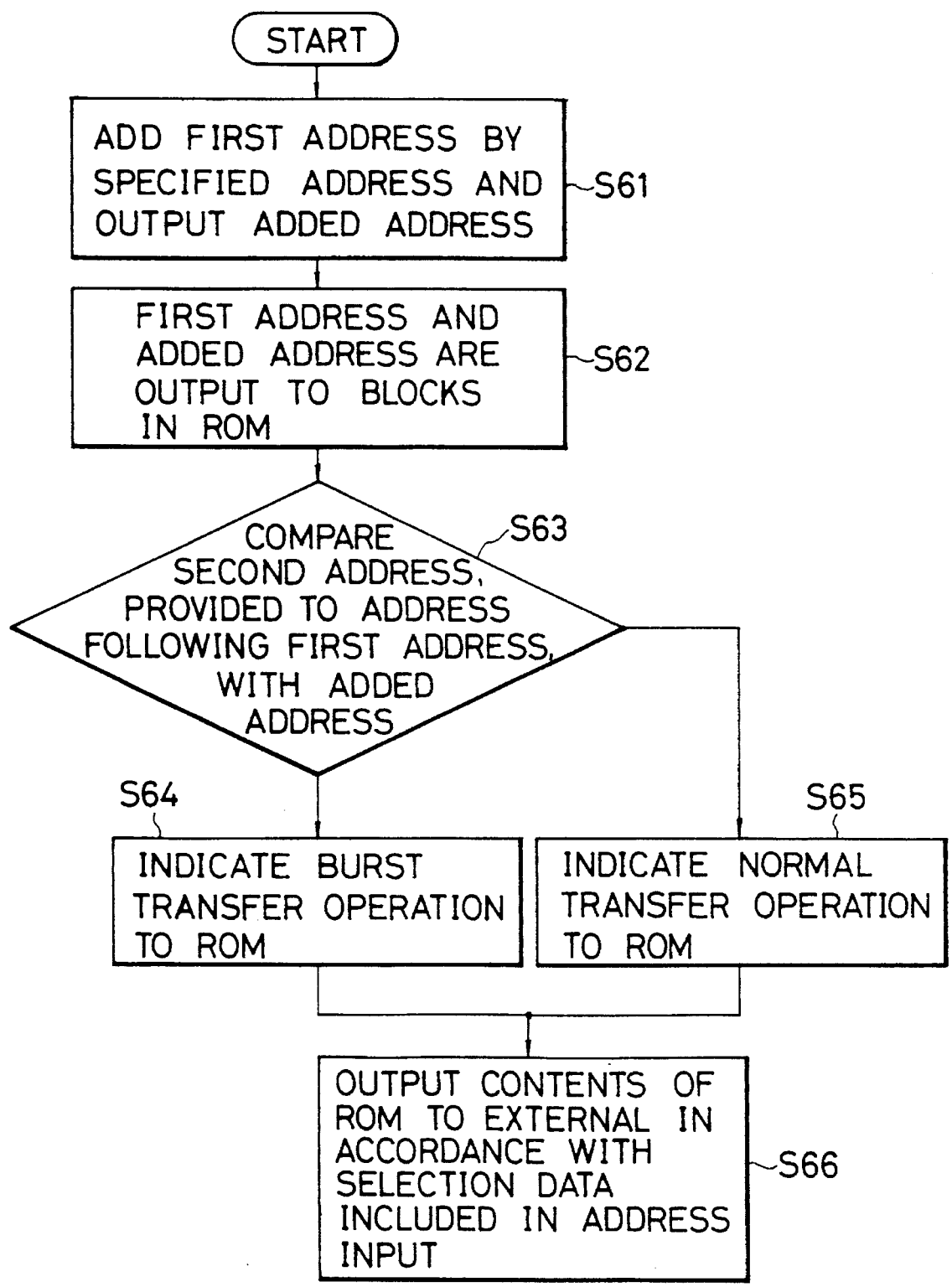
FIG. 6 is a flowchart showing the operation of the microcomputer of FIG. 8.

FIG. 6 is a flowchart for the operation of the microcomputer shown in FIG. 3.

FIG. 3 illustrates a microcomputer of this embodiment comprising an adder 10 for outputting address data, transmitted from a CPU (omitted from the drawings) as a first control means, and added address data which is obtained by adding "1" to the address data; a latch circuit 20 wherein the output from the adder 10 is delayed in response to a system clock $\phi$; a comparator 30 for comparing the address data A < > and the output $(A < > + 1)^\phi$ from the latch circuit 20; a control circuit 40 as a second control means for transmitting a control signal to the CPU (omitted from the drawings); a ROM 60 for storing data; and a selector 50 for selecting data in the ROM 60 and outputting the data to a bus 70 in accordance with the address data. The ROM 60 is divided into two blocks, specifically, a bank 0 and a bank 1.

The address data A < > and the added address data A < > +1, which has been incremented by the adder 10, are input to the banks. The bank 0 and the bank 1 comprise selectors 62, 64 and decoders 66, 68 respectively. Either the address data A < > or the added address data A < >+1, which has been incremented by the adder 10, is selected by the selectors 62, 64 in accordance with the value of the lowest order bit A0 of the address data (because i=1, one bit is used in the block selection data), and is subsequently decoded by the decoders 66, 68, then input to the banks 0, 1.

The microcomputer with a built-in program, having the above-described structure, operates according to the timing chart shown in FIG. 4 and the flow chart shown in FIG. 6.

First, the added address value A < >+1 is formed in the adder 10, based on the address data A < > (step S61). Next, the values of the address value A < > and the added address value A < >+1 are input alternately to the banks 0, 1 by means of a selector signal A0 (step S62). Here, the next address data to be read out is set in the bank into which the address data value of A < >+1 is input.

Accordingly, different address data is formed in each bank at the same time. Then, in the respective banks, the value of a bank per one clock cycle is selected by means of a selection signal of A0 delay in response to the system clock φ, using a pair of latch decoders 80, 82, so that data in the bank corresponding to the address data value is output to the bus 70.

In FIG. 3, BNK0 OUT < > and BNK1 OUT < >, which are output to the latch decoders 80, 82 from the banks 0, 1, indicate data in a bank, specifically in a ROM, which is selected by A0 and the system clock φ, and output.

LDOUT0< > and LDOUT1< > indicate units of data output from the bank 0 and the bank 1 of the ROM latched by A0 and the system clock φ.

For example, when the address input A < >= a, a is input to the bank 0 and A < >+1, specifically, the address a+1, is input to the bank 1, data is formed, and the comparator 30 detects that the address is not in agreement because the next address is not a+1 but is b+1 (step S63).

In this case, the address value is discontinuous and a burst transfer operation is not performed. Specifically, because this is a normal fetch operation, the address value a+1 which is input to the bank 1 is a dummy address value and the data is not used in this case (step S65).

The values output from the banks 0, 1, after being selected alternately by the selector 50 which is controlled by the block selection data A0, are output to the bus < > 70, and during normal transfer the dummy data in each bank is not transferred on the bus BUS< > 70 because it is masked by the selector 50 bus (step S66).

On the other hand, when the comparator 30 detects that the next address value and the added address value are in agreement (step S63), the ROM 60 commences a burst transfer operation (step S64).

However, the comparator 30 compares the value (A < >+1)$^\phi$ from the adder 10 latched by the system block clock φ with the next address data value A < > and, as the result of this comparison, outputs a signal MATCH to the control circuit 40 indicating that the data is in agreement or not in agreement.

In the timing chart of FIG. 4 the signal MATCH indicates that the data is in agreement. The controller circuit 40 processes the signal MATCH output from the comparator 30 and creates a control signal BUSTRDY for interfacing with the CPU and outputs the signal MATCH to the CPU.

When the address values are continuous, that is, during a burst transfer operation, the next address data A < > and the value of (A < >+1)$^\phi$ agree within half a clock cycle, the comparator 30 outputs the signal MATCH, and the control signal BUSTRDY which is output from the control circuit 40 becomes effective, and the burst transfer operation is completed at a certain time when the address data value A < >+1 is not in agreement with the next address data value.

Then, the control circuit 40 detects this lack of agreement, specifically, that the burst transfer operation is completed, and the control signal BUSTRDY becomes ineffective, and transmitted to the CPU.

The CPU receives the control signal BUSTRDY, and the address bus value A < > on the address bus at the point where the burst transfer operation 1s completed is output on the address bus over one clock cycle or two clock cycles.

As a result, the ROM begins to operate at one wait or two waits of a normal cycle.

During the burst transfer (step S64), the CPU transmits continuous address data of one clock cycle width to the ROM, and the ROM confirms the various items of data stored in the ROM by alternately inputting the current address data value A < > and the address data value A < >+1, which is the current address data value A < > incremented by 1, to the two banks, so that it is possible to perform the burst transfer operation smoothly via the latch decoders 80, 82 and the selector 50.

As outlined above, the microcomputer with a built-in program having the configuration of the present embodiment carries out a one-wait or two-wait transfer operation during a normal transfer operation, and it is possible to carry out a transfer operation outputting data continuously to a bus BUS < > from the ROM automatically until the continuous transfer of the address is completed during the burst transfer operation.

There are two banks making up the ROM in the above-mentioned first embodiment, but this is not a limitation of the present invention. In general, it is possible to obtain the same effect when the number of banks is increased to i=2, 3, 4, . . .

Figure 5:
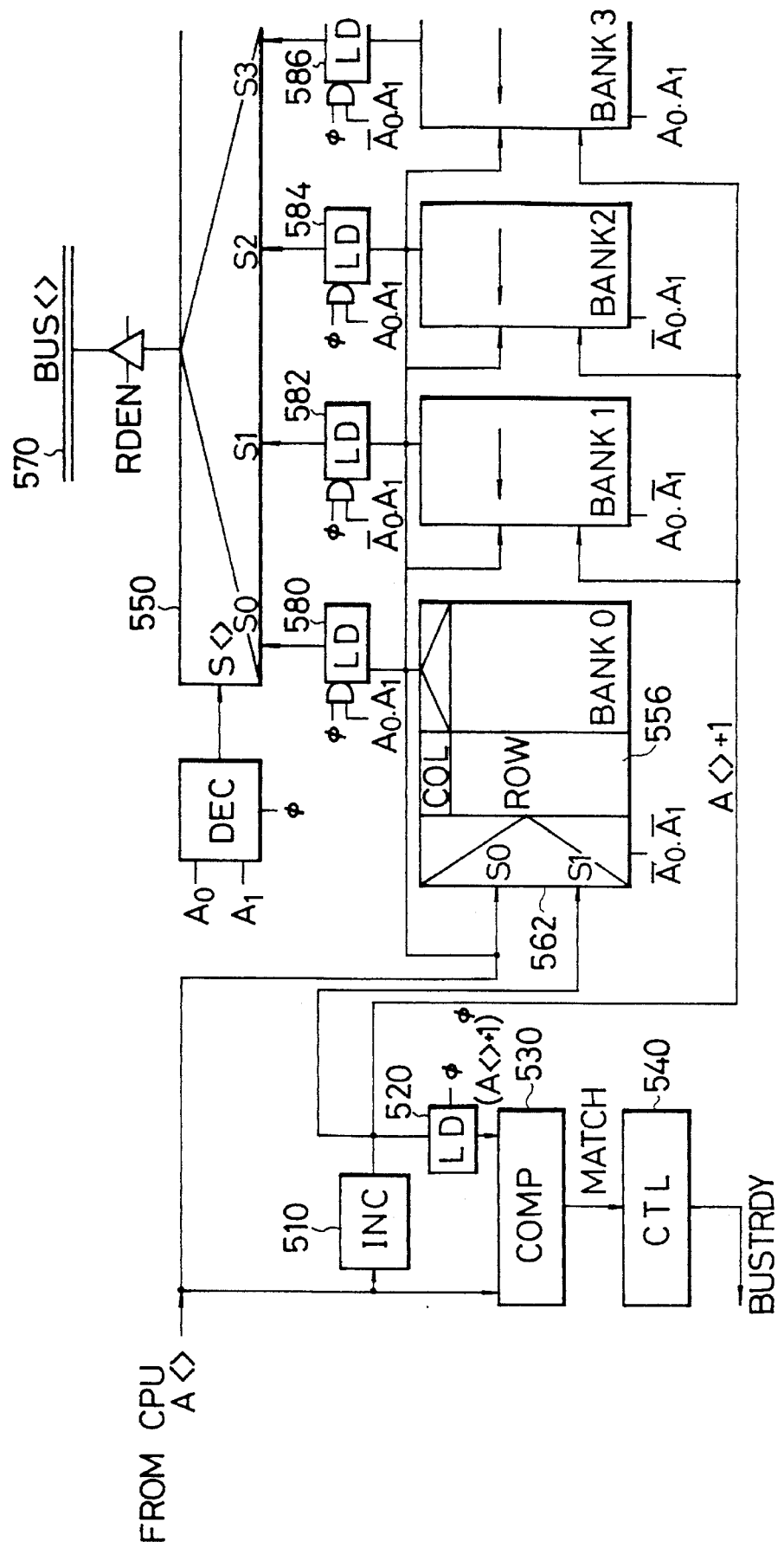
FIG. 5 is a configuration drawing of a second embodiment of a microcomputer with a built-in program using a continuous read-out extension method for a ROM burst transfer of the present invention.

FIG. 5 illustrates another embodiment of a microcomputer with a built-in program of the present invention, and is a configuration drawing for a microcomputer with a built-in program wherein i=2, specifically, where the ROM is divided into four banks.

As shown in the drawing, when i=2 or more, a single adder 510 for incrementing the current address data value by 1, latch decoder 520, comparator 530 for comparing the current address data value and the next input address data value, control circuit 540, and selector 50 for selecting data output from each of the banks, may be provided regardless of the number of banks, and latch decoders 580, 582, 584, 586 for outputting data from the banks 0, 1, 2, 3 set between the respective bank and the bus BUS < > may be provided for the respective banks.

Further, without any restriction as to the type of ROM in the present invention, with a dedicated read-out memory incorporated in the microcomputer system it is possible to execute a continuous burst transfer operation by using all the structural elements disclosed in the present invention.

Even with a NAND type of ROM, for example, NOR type data is acceptable. Also, the adder, comparator, and the like, which are the structural elements of the present invention, are ideally formed inside the ROM module, but, for example, may also be a peripheral ROM module, and also may be provided in a module with another function, such as a CPU or the like.

As can be clearly understood from the foregoing detailed explanation, in a conventional burst transfer operation there is the problem of restriction of the number of burst fetch cycles, but, in the present invention, simple hardware (adder, selector, and the like) is added to a microcomputer and, by inputting the current address and an added address to the banks in the ROM, with no restrictions on the number of divisions (number of banks) in the ROM to which addresses are supplied continuously, continuous read-out is possible without interrupting the data in the ROM to the bus.

Further, the microcomputer of the present invention has a control circuit for generating a control signal which advises the CPU of the possibility of continuous read-out from the ROM to the CPU, based on the results of a comparison by the comparator, by which an address incremented by means of an adder and a next address, are compared, using the comparator for detecting the status in which a burst transfer is possible. Therefore, a high speed read-out operation is possible corresponding to the operating speed of the CPU.

The operating speed of the microcomputer of the present invention is several times faster than the burst transfer speed of a conventional microcomputer.

What is claimed is:

1. A memory device comprising:

memory means comprising a plurality of blocks for reading out data when supplied with an address; and an adder for adding a specific address value to the address and outputting an added address to said plurality of blocks, wherein,
each of said plurality of blocks includes selection means for selecting either the address or the added address
in response to selection data included in the address, and
said memory device outputs data corresponding to either the address or the added address, according to the selection data included in the address.

2. A microcomputer having a built-in ROM capable of operating in a burst transfer mode comprising:

memory means, included in said ROM and being divided into a plurality of blocks, for reading out data when supplied with an address;

first control means for supplying the address to said memory means;

addition means for adding a specific address value to the address and outputting an added address;

comparison means for comparing a next supplied address and the added address and outputting a result of the comparison;

second control means for supplying a control signal indicating to said first control means that a burst transfer will or will not be executed, based on the result of the comparison output by said comparison means;

selection means for selecting data output from said each block and outputting the selected data, wherein:
the address includes selection data for selecting any of the blocks, and the address and the added address are input to the blocks, so that data corresponding to the address or the added address is output in accordance with the selection data in the address;

said selection means selects and outputs the output data from the blocks in accordance with the selection data in the address; and said first control means controls a timing of the supply of the address to said memory means so that the address is synchronized with a read-out timing of said memory means based on the control signal supplied from said second control means.

3. The microcomputer system as claimed in claim 2, wherein the selection data is represented by lower order i bits (where i is a positive integer) in the address; the selected data stored in said memory means is selected by bits other than the lower order i bits of the address; and said memory means is divided into $2^i$ blocks.

4. A continuous read-out extension method for a microprocessor having a built-in ROM capable of operating in a burst transfer mode comprising the steps of:

adding an address of a specified value to an address included in selection data to generate an added address;

supplying the address and the added address to blocks of the ROM for carrying out a data read operation;

comparing a next supplied address and the added address, and outputting results of the comparison;

instructing the ROM to execute a burst address transfer operation when the next supplied address and the added address are in agreement, based on the results of the comparison, and instructing the ROM to execute a normal transfer when the next supplied address and the added address are not in agreement; and selecting data output from the blocks and outputting said data to an external destination, based on the selection data.

* * * * *